US007765235B2

(12) United States Patent
Day et al.

(10) Patent No.: US 7,765,235 B2
(45) Date of Patent: Jul. 27, 2010

(54) SYSTEMS AND METHODS FOR RESOLVING CONFLICTS AND MANAGING SYSTEM RESOURCES IN MULTIMEDIA DELIVERY SYSTEMS

(75) Inventors: Thomas Day, Superior, CO (US); Michael L Craner, Exton, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 151 days.

(21) Appl. No.: 11/323,984

(22) Filed: Dec. 29, 2005

(65) Prior Publication Data

US 2007/0174336 A1 Jul. 26, 2007

(51) Int. Cl.
G06F 7/00 (2006.01)
(52) U.S. Cl. .................... 707/795; 707/913; 725/55; 725/86; 386/46
(58) Field of Classification Search ............ 707/101, 707/104.1; 725/55, 86; 386/46
See application file for complete search history.

(56) References Cited

U.S. PATENT DOCUMENTS

| | | | |
|---|---|---|---|
| 4,264,924 | A | 4/1981 | Freeman |
| 4,264,925 | A | 4/1981 | Freeman et al. |
| 4,573,072 | A | 2/1986 | Freeman |
| 4,706,121 | A | 11/1987 | Young |
| 4,908,707 | A | 3/1990 | Kinghorn |
| 4,945,563 | A | 7/1990 | Horton et al. |
| 4,977,455 | A | 12/1990 | Young |
| 5,012,409 | A | 4/1991 | Fletcher et al. |
| 5,038,211 | A | 8/1991 | Hallenbeck |
| 5,047,867 | A | 9/1991 | Strubbe et al. |
| 5,068,733 | A | 11/1991 | Bennett |
| 5,151,789 | A | 9/1992 | Young |

(Continued)

FOREIGN PATENT DOCUMENTS

EP 0 682 452 11/1995

(Continued)

OTHER PUBLICATIONS

Sheth, A., C. Bertram and K. Shah (1999). "VideoAnywhere: A System for Searching and Managing Distributed Video Assets." *SIGMOD Record* 28(1): 104-109.

(Continued)

*Primary Examiner*—Hosain T Alam
*Assistant Examiner*—Jieying Tang
(74) *Attorney, Agent, or Firm*—Ropes & Gray LLP

(57) ABSTRACT

The invention manages resources and resolve conflicts when locally recording multimedia assets from a variety of sources in multimedia delivery systems. Local and system resources such as storage, tuners, and bandwidth are considered when alternative sources for assets are available (e.g., VOD). Rather than record assets locally, if equivalent assets are available via alternative sources, the recordings are deferred and a pointer to the equivalent asset is stored in lieu of the asset itself. When a user selects a multimedia asset for playback, an "on demand" or alternative source session is started for the asset associated with the pointer. Before the expiration date of the alternative source equivalent of the multimedia asset, it may be downloaded and recorded locally. The system may automatically determine based on various factors, such as transmission bandwidth, latency, and DRM, whether to store assets or pointers.

38 Claims, 7 Drawing Sheets

U.S. PATENT DOCUMENTS

| | | | |
|---|---|---|---|
| 5,187,589 A | 2/1993 | Kono et al. |
| 5,195,134 A | 3/1993 | Inoue |
| 5,210,611 A | 5/1993 | Yee et al. |
| 5,223,924 A | 6/1993 | Strubbe |
| RE34,340 E | 8/1993 | Freeman |
| 5,253,066 A | 10/1993 | Vogel |
| 5,285,284 A | 2/1994 | Takashima et al. |
| 5,296,931 A | 3/1994 | Na |
| 5,323,234 A | 6/1994 | Kawasaki |
| 5,410,344 A | 4/1995 | Graves et al. |
| 5,416,508 A | 5/1995 | Sakuma et al. |
| 5,479,268 A | 12/1995 | Young et al. |
| 5,485,219 A | 1/1996 | Woo |
| 5,532,754 A | 7/1996 | Young et al. |
| 5,534,911 A | 7/1996 | Levitan |
| 5,539,822 A | 7/1996 | Lett |
| 5,550,576 A | 8/1996 | Klosterman |
| 5,568,272 A | 10/1996 | Levine |
| 5,576,755 A | 11/1996 | Davis et al. |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,619,274 A | 4/1997 | Roop et al. |
| 5,629,733 A | 5/1997 | Youman et al. |
| 5,631,995 A | 5/1997 | Weissensteiner et al. |
| 5,632,007 A | 5/1997 | Freeman |
| 5,657,414 A | 8/1997 | Lett et al. |
| 5,684,525 A | 11/1997 | Klosterman |
| 5,694,381 A | 12/1997 | Sako |
| 5,699,107 A | 12/1997 | Lawler et al. |
| 5,721,829 A | 2/1998 | Dunn et al. |
| 5,724,091 A | 3/1998 | Freeman et al. |
| 5,727,060 A | 3/1998 | Young |
| 5,758,257 A | 5/1998 | Herz et al. |
| 5,790,198 A | 8/1998 | Roop et al. |
| 5,801,787 A | 9/1998 | Schein et al. |
| 5,805,763 A | 9/1998 | Lawler et al. |
| 5,808,608 A | 9/1998 | Young et al. |
| 5,809,204 A | 9/1998 | Young et al. |
| 5,812,205 A | 9/1998 | Milnes et al. |
| 5,812,937 A | 9/1998 | Takahisa et al. |
| 5,828,945 A | 10/1998 | Klosterman |
| 5,850,218 A | 12/1998 | LaJoie et al. |
| 5,880,768 A | 3/1999 | Lemmons et al. |
| 5,940,572 A | 8/1999 | Balaban et al. |
| 5,949,954 A | 9/1999 | Young et al. |
| 5,969,748 A | 10/1999 | Casement et al. |
| 5,974,222 A | 10/1999 | Yuen et al. |
| 6,081,291 A | 6/2000 | Ludwig, Jr. |
| 6,091,883 A | 7/2000 | Artigalas et al. |
| 6,141,488 A | 10/2000 | Knudson et al. |
| 6,154,771 A | 11/2000 | Rangan et al. |
| 6,157,413 A | 12/2000 | Hanafee et al. |
| 6,177,931 B1 | 1/2001 | Alexander et al. |
| 6,185,360 B1 | 2/2001 | Inoue et al. |
| 6,208,799 B1 | 3/2001 | Marsh et al. |
| 6,233,389 B1 | 5/2001 | Barton et al. |
| 6,275,648 B1 | 8/2001 | Knudson et al. |
| 6,327,418 B1 | 12/2001 | Barton et al. |
| 6,442,332 B1 | 8/2002 | Knudson et al. |
| 6,473,559 B1 | 10/2002 | Knudson et al. |
| 6,505,348 B1 | 1/2003 | Knowles et al. |
| 6,564,005 B1 | 5/2003 | Berstis |
| 6,681,396 B1 | 1/2004 | Bates et al. |
| 6,756,997 B1 | 6/2004 | Ward, III et al. |
| 6,760,538 B1 | 7/2004 | Bumgardner et al. |
| 6,771,886 B1 | 8/2004 | Mendelsohn |
| 7,088,910 B2 | 8/2006 | Potrebic et al. |
| 7,330,693 B1 | 2/2008 | Goss |
| 2001/0028782 A1 | 10/2001 | Ohno et al. |
| 2002/0040475 A1* | 4/2002 | Yap et al. ............ 725/39 |
| 2002/0059621 A1 | 5/2002 | Thomas et al. |
| 2002/0144279 A1 | 10/2002 | Zhou |
| 2002/0169712 A1 | 11/2002 | Ginzboorg et al. |
| 2002/0174430 A1 | 11/2002 | Ellis et al. |
| 2002/0174433 A1 | 11/2002 | Baumgartner et al. |
| 2003/0009766 A1 | 1/2003 | Marolda |
| 2003/0067554 A1* | 4/2003 | Klarfeld et al. ............ 348/461 |
| 2003/0118323 A1 | 6/2003 | Ismail et al. |
| 2003/0126607 A1 | 7/2003 | Phillips et al. |
| 2003/0149988 A1 | 8/2003 | Ellis et al. |
| 2003/0198462 A1 | 10/2003 | Bumgardner et al. |
| 2003/0206719 A1 | 11/2003 | Bumgardner et al. |
| 2003/0208763 A1 | 11/2003 | McElhatten et al. |
| 2004/0049794 A1 | 3/2004 | Shao et al. |
| 2004/0103434 A1 | 5/2004 | Ellis et al. |
| 2004/0117845 A1 | 6/2004 | Karaoguz et al. |
| 2004/0125779 A1 | 7/2004 | Kelton et al. |
| 2004/0154040 A1 | 8/2004 | Ellis |
| 2004/0156614 A1 | 8/2004 | Bumgardner et al. |
| 2004/0181814 A1 | 9/2004 | Ellis et al. |
| 2004/0187150 A1* | 9/2004 | Gonder et al. ............ 725/39 |
| 2004/0210932 A1 | 10/2004 | Mori et al. |
| 2005/0015804 A1 | 1/2005 | LaJoie et al. |
| 2005/0050218 A1 | 3/2005 | Sheldon et al. |
| 2005/0105528 A1 | 5/2005 | Kobayashi et al. |
| 2005/0160461 A1 | 7/2005 | Baumgartner et al. |
| 2005/0193015 A1* | 9/2005 | Logston et al. ............ 707/104.1 |
| 2005/0204388 A1 | 9/2005 | Knudson et al. |
| 2005/0234992 A1* | 10/2005 | Haberman ............ 707/104.1 |
| 2005/0235323 A1 | 10/2005 | Ellis et al. |
| 2005/0238168 A1 | 10/2005 | Lee et al. |
| 2006/0140584 A1 | 6/2006 | Ellis et al. |
| 2006/0174270 A1 | 8/2006 | Westberg et al. |
| 2007/0071399 A1 | 3/2007 | Ellis |
| 2007/0104456 A1 | 5/2007 | Craner |
| 2008/0066016 A1 | 3/2008 | Ellis et al. |
| 2008/0092168 A1 | 4/2008 | Logan et al. |

FOREIGN PATENT DOCUMENTS

| | | |
|---|---|---|
| EP | 0 753 964 | 1/1997 |
| EP | 0 836 320 | 4/1998 |
| EP | 0 854 645 | 7/1998 |
| EP | 1 187 467 A | 3/2002 |
| EP | 1 292 137 A1 | 3/2003 |
| GB | 2 229 595 | 9/1990 |
| JP | 11-136615 | 5/1999 |
| JP | 11-313280 | 11/1999 |
| JP | 2004-07592 | 1/2004 |
| JP | 2004-23326 | 1/2004 |
| WO | WO 92/22983 | 12/1992 |
| WO | WO 93/23957 | 11/1993 |
| WO | WO 96/26605 | 8/1996 |
| WO | WO 96/36172 | 11/1996 |
| WO | WO 96/37075 | 11/1996 |
| WO | WO 97/13368 | 4/1997 |
| WO | WO 98/48566 | 10/1998 |
| WO | WO 99/52279 | 10/1999 |
| WO | WO 99/66725 | 12/1999 |
| WO | WO 00/04706 | 1/2000 |
| WO | WO 00/07368 | 2/2000 |
| WO | WO 00/08852 | 2/2000 |
| WO | WO 00/16548 | 3/2000 |
| WO | WO 00/40026 A | 7/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/67475 | 11/2000 |
| WO | WO 01/22729 | 3/2001 |
| WO | WO 01/76239 | 10/2001 |
| WO | WO 03/041410 A | 5/2003 |

| WO | WO 2004/002156 A | 12/2003 |
| WO | WO 2004/019602 A | 3/2004 |

OTHER PUBLICATIONS

Non-Final Office Action dated Sep. 4, 2008 issued in U.S. Appl. No. 11/324,201.
Response dated Dec. 3, 2008 to Non-Final Office Action dated Sep. 4, 2008 issued in U.S. Appl. No. 11/324,201.
Non-Final Office Action dated Jan. 26, 2009 issued in U.S. Appl. No. 11/324,201.
Examiner Interview Summary Record dated Apr. 22, 2009 issued in U.S. Appl. No. 11/324,201.
Response dated May 21, 2009 to Non-Final Office Action dated Jan. 26, 2009 issued in U.S. Appl. No. 11/324,201.
Non-Final Office Action dated Sep. 1, 2009 issued in U.S. Appl. No. 11/324,201.
Response dated Nov. 3, 2009 to Non-Final Office Action dated Sep. 1, 2009 issued in U.S. Appl. No. 11/324,201.
Final Office Action issued dated Feb. 18, 2010 in U.S. Appl. No. 11/324,201.

* cited by examiner

SYSTEMS AND METHODS FOR RESOLVING CONFLICTS AND MANAGING SYSTEM RESOURCES IN MULTIMEDIA DELIVERY SYSTEMS

BACKGROUND OF THE INVENTION

This invention relates to recording of multimedia assets, such as video programs. More particularly, this invention relates to systems and methods for managing resources and preventing conflicts when locally recording media assets in multimedia delivery systems.

Multimedia delivery networks (e.g., cable, satellite, Internet) have been developed that can deliver various multimedia assets from a remote source to a user's equipment for viewing or interaction. Multimedia assets include live broadcast programs, web casts, Pay-per-View (PPV) events, and/or video-on-demand (VOD) content. Sometimes, a user may select multimedia content to be recorded locally on the user's equipment, for example, on a VCR or digital video recorder (PVR). A live broadcast is typically viewed and recorded at the scheduled time set by the broadcast station, whereas VOD content can be viewed and recorded at any user-specified time prior to the expiration time of the VOD content. PPV programs also have expiration dates and may be viewed and recorded at certain times specified by a content provider.

Recording a multimedia asset requires a tuner associated with the user equipment to be tuned to the channel in which the multimedia asset is available. Recording an additional multimedia asset at the same time on the same device could require an additional tuner. If the device does not have an additional tuner, the user may have to forgo recording the additional multimedia asset.

Further, each multimedia asset recorded locally requires some amount of local storage. The storage capacity of a user's equipment will typically set an upper bound on the number and length of multimedia assets the user may store locally.

Sometimes, particular multimedia assets that are broadcast are also available via VOD, PPV, and/or Internet mechanisms.

Accessing and optionally locally storing such multimedia assets using one mechanism versus another may be advantageous in one way or another to the user and/or service provider. Present day systems, however, lack an integrated approach to managing the access and/or recording of multimedia assets in a coordinate fashion across these mechanisms.

SUMMARY OF THE INVENTION

Problems in the prior art are addressed, in accordance with principles of the present invention, by a method and apparatus in a delivery system for reconciling recording scheduling conflicts between multiple multimedia assets that are available via more than one delivery mechanism.

In one embodiment, the method and apparatus dynamically manages local storage capacity and/or system transmission bandwidth, to determine if broadcast multimedia assets should be locally recorded or viewed via a VOD or PPV delivery mechanism.

In one embodiment the invention is a method and apparatus that dynamically manages system resources based on tuner availability in a user's equipment to decide if broadcast multimedia assets should be locally recorded or viewed via a VOD or PPV delivery mechanism.

In one embodiment, the invention is a method and apparatus for managing local recording space in a VOD system. The invention involves receiving a request for scheduling a local recording of a multimedia asset, the asset available via a broadcast delivery mechanism, determining if an equivalent multimedia asset is available via a VOD or a PPV delivery mechanism, and locally storing a VOD or PPV content identifier for the equivalent multimedia asset instead of locally recording the multimedia asset. In one or more of the above embodiments, VOD content information such as an expiration time of the VOD content on the VOD server or pricing of the VOD content may be associated with the VOD content identifier. This information may be displayed to the user.

In one embodiment, the invention is a method and apparatus for managing local recording space in a VOD system. The invention involves comparing locally stored content with available VOD or PPV content, and replacing the locally stored content with a VOD or PPV content identifier.

In one embodiment the invention is a method and apparatus for reconciling scheduling conflicts when locally recording a plurality of broadcast multimedia assets. The invention involves scheduling a first time window for locally recording a first multimedia program and scheduling a second time window for locally recording at least one other multimedia asset. If an overlap between the first and second time window is detected, for example, by suitable control circuitry on the user equipment, an application may be invoked to determine if at least one of the plurality of multimedia assets is additionally available via a VOD or PPV delivery mechanism. If it is, then local recording of the at least one multimedia program may be deferred.

In one or more of these embodiments, in lieu of recording a multimedia asset, a VOD or PPV identifier for an equivalent multimedia asset may be locally stored, which identifier may redirect a user's equipment to the equivalent multimedia asset for retrieval via VOD or PPV delivery mechanisms. If no overlap is detected, the multimedia asset may be locally recorded. Also, an expiration date may be determined for the equivalent multimedia asset that is available via VOD or PPV. In one or more of these embodiments, a user may be notified that a scheduling conflict cannot be resolved if the expiration date precedes or corresponds with the overlap of the time windows. In one variant of this embodiment, recording of the multimedia asset is deferred in lieu of storage of a pointer, but only for some limited amount of time. If it is determined that an expiration of the PPV or VOD based multimedia asset is imminent, the system facilitates the recording of the multimedia asset, potentially from the PPV or VOD source, or from a future broadcast schedule for the multimedia asset that occurs before the expiration of the multimedia asset from the VOD or PPV delivery mechanism.

In some of the above embodiments, the storage capacity of the local recording device may be checked before a multimedia asset is recorded. Only if the storage capacity is sufficient for recording the multimedia asset will the asset be recorded. In either case, the system may be configured to automatically determine whether an equivalent copy of the multimedia asset is available from a VOD server or a PPV channel and thus may be available for some time in the future. If the multimedia asset is available for some time in the future via these delivery mechanisms, to conserve space, the asset is not recorded but instead an identifier (pointer) referring to the asset may be stored on the recording device instead of the actual asset. Similarly, a previously locally stored program may be deleted from the local recording device if it is available via VOD or PPV delivery mechanisms. To ensure the deleted program is available for viewing in the future, though it may become unavailable from the VOD server at some future time, the system monitors the expiration date of the availability of the asset from the VOD or PPV delivery mechanisms, and may, before the expiration date of the availability, record the asset locally, the assumption being that the amount of available space on the local recording device may have improved by the time the recording is performed. The user may be notified, for example, by a message displayed on a display device, if the storage capacity remains insufficient to store the imminently expiring asset.

In another embodiment, the invention is a method for dynamically managing resources when locally recording a multimedia asset in a Video-on-Demand (VOD) system. The method involves selecting a multimedia asset to be locally recorded, determining availability of the multimedia asset from a VOD server, and if the multimedia asset is available, applying a resource criterion to determine if the multimedia asset should be locally recorded. Application of the resource criterion may include determining a VOD session capacity for transmitting the VOD content from the VOD server, and determining locally available recording space for the VOD content.

VOD session capacity includes transmission bandwidth from the VOD server and/or VOD server access time. The multimedia assets may be locally recorded if the VOD session capacity is insufficient for real-time transmission of the VOD content from the VOD server.

Other aspect of the invention are directed to a system for reconciling scheduling conflicts when locally recording a plurality of multimedia assets on a VOD client, and to a system for dynamically managing system resources when locally recording multimedia assets in a VOD server/client application.

In one embodiment, the invention is a user feature for finding multimedia assets available during a future viewing period of interest, along with a system that supports the user feature. In one or more of these embodiments, the user feature is called "watch-later." When a user selects the "watch-later" feature, a dialog is presented that allows the user to specify when (e.g., next Saturday night from 7 PM to 10 PM) he/she is interested in watching something. The system then searches out all multimedia assets that are available up to the beginning of the watch-later period, from whatever source (e.g., PPV, VOD, Internet, and broadcast). Recognizing that if one or more of those assets expires before the beginning of the watch-later period, it could be recorded, and considering the factors as described in other embodiments which might or might not allow those assets to be stored or viewable during the watch-later period, the user feature presents to the user all assets that would be available for viewing during the watch-later period. The watch-later feature presents these assets and makes one or more of them available for selection, dynamically modifying the "available" assets presented as a function of those that get selected, in consideration of, for example local storage.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

The disclosed systems and method are directed to managing resources and preventing conflicts when locally recording multimedia assets in situations where the multimedia assets is also available from a VOD server or via PPV.

Figure 1:
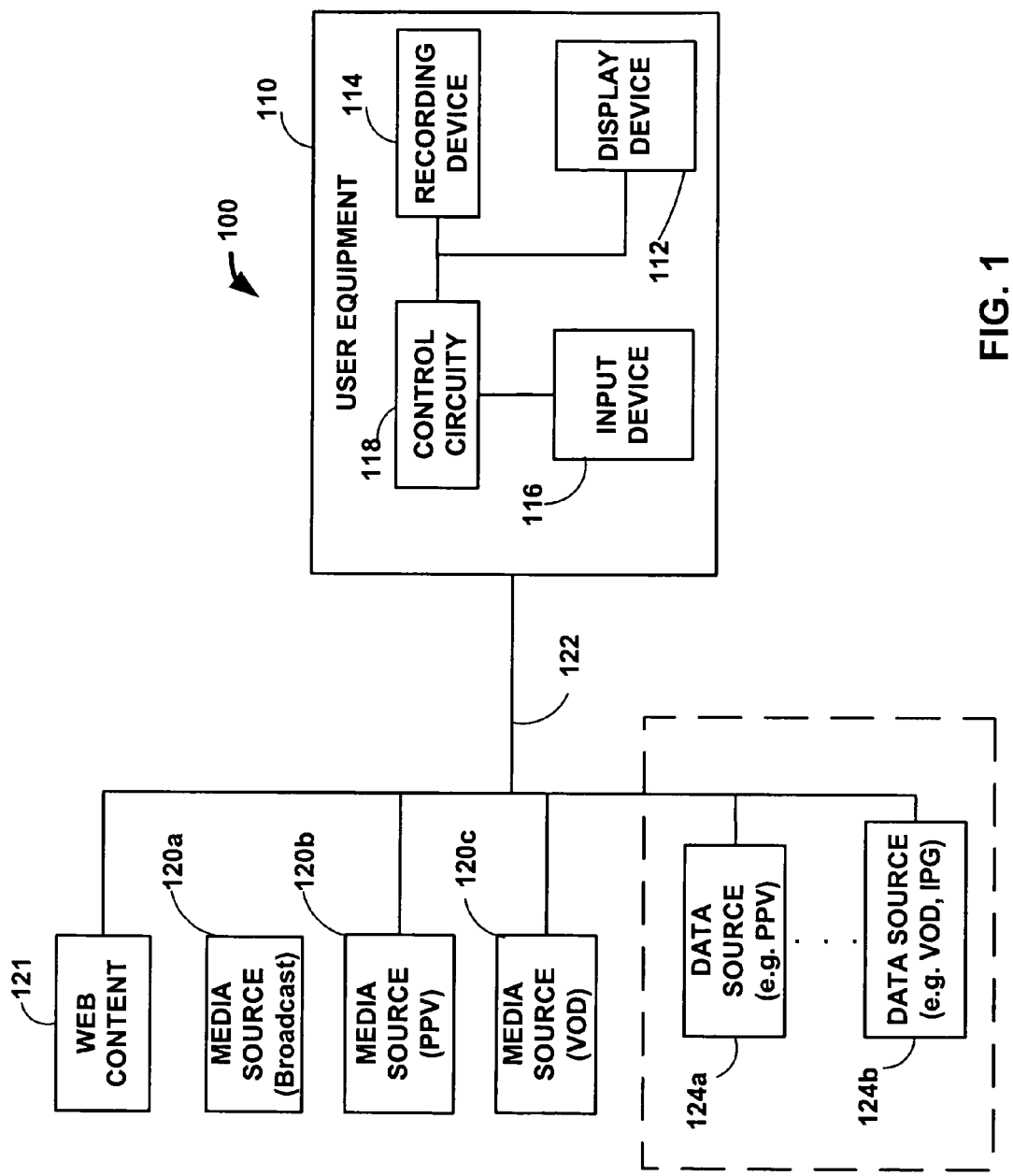
FIG. 1 is a block diagram of a video-on-demand (VOD) system in accordance with one embodiment of the present invention.

FIG. 1 shows illustrative interactive multimedia delivery system 100 in accordance with one embodiment of the invention. User equipment 110 receives content in the form of signals from multimedia sources 120a, 120b, 120c over communications path 122. In practice there may be multiple multimedia sources 120a, 120b and user equipment 110, but only three multimedia sources and one user equipment have been shown in FIG. 1 to avoid over-complicating the drawing.

Multimedia sources 120a, 120b, 120c may be any suitable multimedia source such as, for example, a cable system headend, satellite multimedia distribution facility, multimedia broadcast facility, pay-per-view (PPV) server, game service provider (e.g., for online gaming), or any other suitable facility or system for originating or distributing content. Multimedia source 120c is depicted as an on-demand server (e.g., VOD server). Multimedia sources 120a, 120b, 120c may be configured to transmit signals over any suitable communications path 122 including, for example, a satellite path, a fiber-optic path, a cable path, an Internet path, or any other suitable wired or wireless path. The signals may carry any suitable content such as, for example, television programs, games, music, news, web services, or any other suitable content. In some embodiments, multimedia sources 120a, 120b, 120c may include control circuitry for executing the instructions of an interactive multimedia guidance application such as, for example a client/server or online interactive multimedia guidance application.

User equipment 110 may include any equipment suitable for providing an interactive multimedia experience. User equipment 110 may include television equipment such as a television, set-top box, recording device, video player, user input device (e.g., remote control, keyboard, mouse, touch pad, touch screen and voice recognition interface), or any other device suitable for providing an interactive multimedia experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a gaming system, a portable electronic device, such as a portable DVD player, a portable gaming device, a cellular telephone, a PDA, a music player (e.g., MP3 player), or any other suitable portable or fixed device.

In the example of FIG. 1, user equipment 110 includes at least control circuitry 118, display device 112, recording device 114 and user input device 116, which may be implemented as separate devices or as a single device. An interactive multimedia guidance application, such as an interactive television program guide (IPG), may be implemented on user equipment 110 to display, on display device 112, the content transmitted by multimedia sources 120a, 120b, 120c over path 122 and to provide interactive multimedia guidance application features such as a grid listing of available assets. In addition, Web content 121, such as streamed audio and video, may be transmitted to the user equipment 110, for example, over the Internet.

Display device 112 may be any suitable device such as, for example, a television monitor, a computer monitor, or a display incorporated in user equipment 110 (e.g., a cellular telephone or music player display). Display device 112 may also be configured to provide for the output of audio.

Control circuitry 118 is adapted to receive user input from input device 116 and execute the instructions of the interactive multimedia guidance application. Control circuitry 118 may include one or more tuners (e.g., analog or digital tuners), encoders and decoders, processors (e.g., Motorola 68000 family processors), memory (e.g., RAM and hard disks), communications circuitry (e.g., cable modem circuitry), input/output circuitry (e.g., graphics circuitry), connections to the various devices of user equipment 110, and any other suitable component for providing analog or digital multimedia programming, program recording, and interactive multimedia guidance features. In some embodiments, control circuitry 118 may be included as part of one of the devices of user equipment 110 such as, for example, part of display 112 or any other device (e.g., a set-top box, television and video player).

In some embodiments, the interactive multimedia guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to multimedia sources 120a, 120b, 120c and one or more data sources 124a, 124b. But for the clarity of the figure, the equipment of only a single user is shown. The equipment of the plurality of users may be connected to multimedia sources 120a, 120b, 120c, web content 121, and data sources 124a, 124b using a cable television network, a local area network (LAN), a wireless network, or any other suitable means or combination thereof. In some embodiments, the equipment of the plurality of users may be connected to each other using any suitable means.

User equipment 110 may receive interactive multimedia guidance application data from one or more data sources 124a, 124b. Data sources 124a, 124b may provide data for a particular type of content or for a particular application. For example, one data source 124a may provide data for non-on-demand assets (e.g., non-pay and pay-per-view programs), and another data source 124b may provide data for on-demand assets (e.g., VOD programs). Or, for example, a single data source may provide both of these types of data. For example, one of the data sources 124b or an additional data source (not shown) may also provide data for an interactive television program guide (IPG). Another of the data sources 124a, 124b or a separate data source (not shown) may provide, for example, data for another interactive application (e.g., a home shopping application). In some embodiments, data sources 124a, 124b or additional data source (not shown) may provide data to the interactive multimedia guidance application using a client/server approach. There may be one server per data source, one for all sources or, in some embodiments, a single server may communicate as a proxy between user equipment 110 and various data sources 124a, 124b. In some embodiments, data sources 124a, 124b may provide data as an online interactive multimedia guidance application. In such embodiments, data sources 124a, 124b may include control circuitry for executing the instructions of the online multimedia guidance application.

FIG. 1 shows multimedia sources 120a, 120b, 120c and data sources 124a, 124b as separate elements. In practice, their functionality may be combined and provided from a single system at a single facility, or multiple systems at multiple facilities. For example, one multimedia source 120b and data source 124b may be combined to provide VOD content and associated VOD data.

For the purposes of clarity, the following discussion may sometimes describe an embodiment in which the interactive multimedia guidance application is an interactive program guide (IPG). It will be understood, however, that the following discussion and the features discussed may be applied to any interactive multimedia guidance application.

In one scenario, a user may want to locally record a program from a multimedia source 120a, 120b, 120c, such as a broadcast program, or web content 121, or a pay-per-view program, for example, from data source 124a. The IPG residing on the user equipment 110 will then check if the same program is also available as VOD content from a VOD server and may, if the program is available as VOD content, defer recording of the actual program until, for example, just before the expiration date of the VOD content. In this case, the IPG may indicate in the user's PVR recording list that the VOD content was recorded locally on recording device 114, while in fact only storing a pointer to the VOD content on the VOD server or a small "quick start-up" portion of the VOD content.

In another scenario, a user may, sometimes inadvertently, schedule programs from multimedia sources 120a, 120b, 120c, web content 121, or one of the other data sources 124a, 124b to be recorded concurrently. As the user equipment may lack multiple tuners for simultaneously recording more than one or at most a few channels, a user must typically make a choice between those programs. If at least one of these programs is available as equivalent VOD content from a VOD server, the user may want to defer recording of the equivalent VOD content until a current program that is not available on a VOD server has been recorded. It will be understood that the interactive multimedia system 100 can be configured to assign and change recording times to eliminate scheduling conflicts automatically, without user input.

The following flow charts serve to illustrate methods involved in some embodiments of this invention. Though the examples focus on content that is alternatively available via a VOD server delivery mechanism, the invention is equivalently applicable to content that is alternatively available via PPV channels or Internet delivery mechanisms. Though the invention applies broadly to multimedia assets, as described earlier to include video/audio programs, interactive content, games, and applications; the following example is provided with respect to video/audio programs for clarity.

Figure 2:
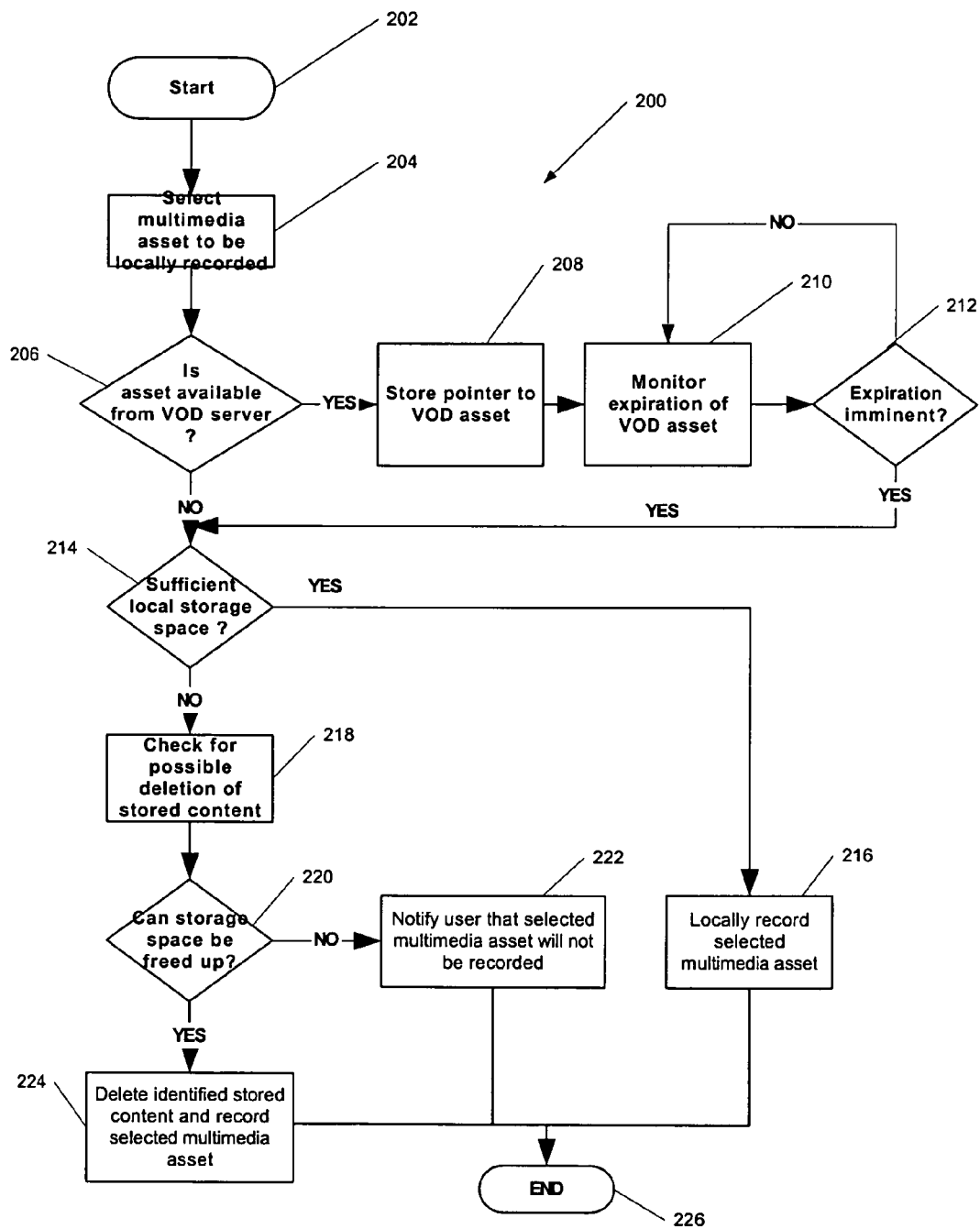
FIG. 2 shows a flow chart of an illustrative process for managing local recording of VOD content in accordance with one embodiment of the present invention.

FIG. 2 is a flow chart of an illustrative process 200 for managing local recording of a requested program from a multimedia source 120a, 120b, 120c or the other data and content sources shown in FIG. 1, which takes into consideration the availability of the requested program as VOD content on a VOD server and the local storage capacity for the VOD content on the user equipment. Process 200 begins at step 202. At step 204, the interactive television application schedules a program to be recorded on the local recording device, such as recording device 114 (FIG. 1). For example, the interactive television application may receive user input from user input device 116 (FIG. 1) to record a program. It will be understood that more than one program can be scheduled for recording at the same time or at different times. At step 206, the interactive television application determines whether the selected program or programs is/are available as equivalent VOD content from a VOD server. VOD content is typically only available during a specified time window, with an expiration date which is listed, for example, on a corresponding page of the interactive television program guide (IPG). If the interactive television application determines at step 206 that the selected program will still be available as VOD content on the VOD server at a later time, perhaps for a few more days or weeks, the process 200 may decide that the equivalent VOD content need not yet be recorded locally, since it can still be retrieved from the VOD server. The process 200 then moves to step 208 a pointer or VOD content identifier referring to the equivalent VOD content is stored, for example, on the user's equipment. In some implementations it may be transparent to the user whether the program has been actually recorded and stored locally or if only the corresponding pointer is stored. This embodiment can conserve valuable recording space on the user's recording device 114 while presenting a easy to use and understand interface for the user.

As the program has not actually been locally recorded, the process 200 continues to monitor, for example via the IPG, the expiration date of the VOD content at step 210, as the original expiration date may have been changed by the content supplier of the VOD content. At step 212, the process 200 continues to monitor the expiration date and no further action is taken, unless the expiration date is imminent, for example, less than one day away. If expiration of the VOD content at the VOD server is imminent, process 200 moves to step 214 and prepares to record the equivalent VOD content on the user's recording device 114.

If at step 206 the interactive television application determines that the selected program or content will not be available as equivalent VOD content from a VOD server, the process 200 moves directly to step 214.

At step 214, process 200 then determines if recording device 114 has sufficient storage capacity to record the selected program or the equivalent VOD content from the VOD server. If sufficient storage capacity is available, process 200 moves to step 216 to schedule local recording of the program or VOD content.

Conversely, if it is determined at step 214 that recording device 114 lacks the storage capacity to store the selected program or equivalent VOD content, process 200 will check at step 218 for programs stored on recording device 114 that may be deleted. Permission to delete a stored program may be given by the VOD client based, for example, on dynamic factors (for example, if a stored program is designated as "archived" and/or when the user has last watched the VOD content and/or how frequently the user has accessed the stored program), as well as rental conditions for the stored program. The program targeted for deletion may be a stored VOD content or another recorded program, such as pay-per-view or broadcast. Contractual rental conditions may stipulate that a recorded program cannot be watched past a certain expiration date, which may or may not coincide with the availability of the program from a network server.

At step 220, if it is determined that sufficient storage space can be freed up on recording device 114, the process 200 moves to step 224 and deletes one or more identified stored programs and prepares to record the requested VOD content. If no storage space or only an insufficient amount of storage space can be provided, process moves from step 220 to step 222 and notifies the user that the requested program or VOD content cannot be recorded due to lack of storage capacity, unless the user manually deletes stored programs to free up space. Process 200 ends at step 226.

Figure 3:
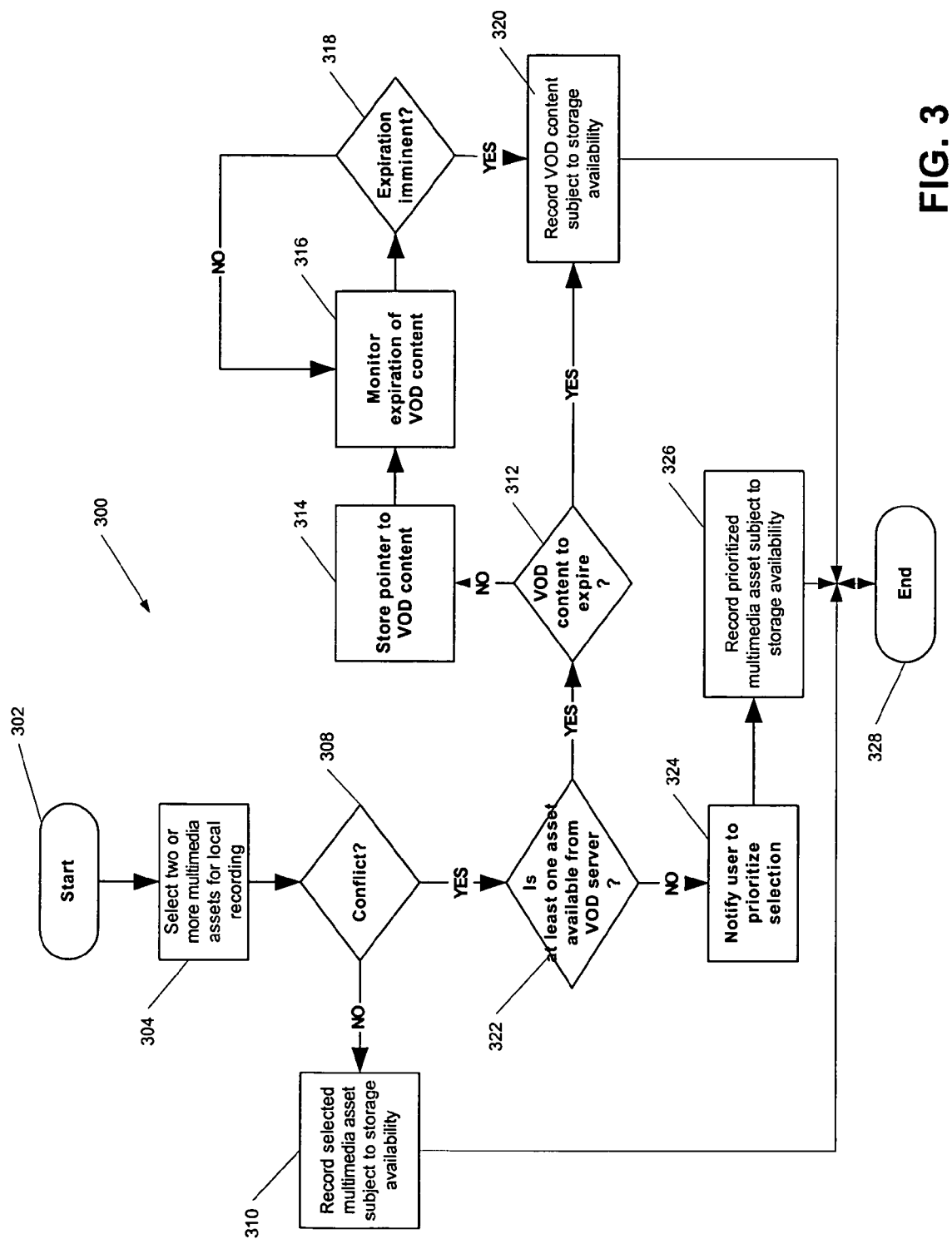
FIG. 3 shows a flow chart of an illustrative process for resolving conflicts when locally recording content from different sources in accordance with one embodiment of the present invention.

FIG. 3 is a flow chart of an illustrative process for resolving conflicts when locally recording two or more different programs on, for example, recording device 114. Process 300 starts at step 302. At step 304, the user selects two or more programs for recording. Each program can be delivered via broadcast, video streamed over the Internet, PPV and/or VOD.

At step 308 the interactive television application then checks to see if recording of the two or more programs would create a conflict. A conflict may occur, for example, if the recording times for the two or more programs overlap and not enough tuners are available to concurrently record the programs.

If it is determined at step 308 that no conflict exists, then at step 310 the recording time for both program are set to the airing times listed in the IPG for those programs, a check is performed to see if sufficient storage space is available on recording device 114, the programs are recorded at their future airing times, and process 300 then ends at step 328. Conversely, if a scheduling conflict is detected at step 308, then, in step 322, a check is performed to see if at least one of the selected programs is available as VOD content from a VOD server. If one of the selected programs is available on a VOD server, a message may be displayed indicating this fact to the user. The interactive multimedia guidance application may then prompt the user to order the VOD version instead of the originally requested program version, which may have the added advantage of, e.g., avoiding commercials and/or preventing conflicts with the recording of other programs. Alternatively, the interactive multimedia guidance application may automatically select the VOD version of the selected program, without requiring user input, and will also check the expiration date/time of the VOD content from the VOD server, step 312.

The following steps 314, 316, 318, and 320 of process 300 are substantially identical to steps 208, 210, 212, and 214 of process 200 described earlier. If the interactive multimedia guidance application determines at step 312 continued availability of the VOD content, the process 300 may decide that local storage of the requested VOD content is not yet necessary and at step 314 a pointer or VOD content identifier is stored on the user equipment, rather than recording the actual VOD content locally.

The process 300 continues to monitor the expiration date of the VOD content at step 316, which expiration date/time may have changed from the time the VOD content was originally requested. At step 318, a test is performed to see if the expiration date/time of the asset is imminent (e.g., less than a day away). Unless the expiration date is imminent, monitoring of the expiration date continues with the loop between the test of step 318 and step 316 and no further action is taken. If the expiration is imminent, at step 320 the VOD content is recorded subject to availability of storage space on recording device 114, as described before.

In other words, as in process 200 of FIG. 2, the requested program will not be recorded locally unless and until the equivalent VOD program becomes imminently unavailable from the VOD server. Determining storage availability at step 320 includes essentially all the steps 214 through 224 of process 200 described above. Actual recording of the VOD content will commence only if recording device 114 has sufficient storage capacity.

If a conflict is identified at step 308 and it is determined at step 322 that none of the selected programs is available from a VOD server, the process 300 moves to step 324, notifying the user of the scheduling conflict. At step 326, the user may be given the option to select one of the programs for local recording, again subject to availability of sufficient storage space on recording device 114, as discussed earlier. The process 300 ends at step 328.

Figure 4:
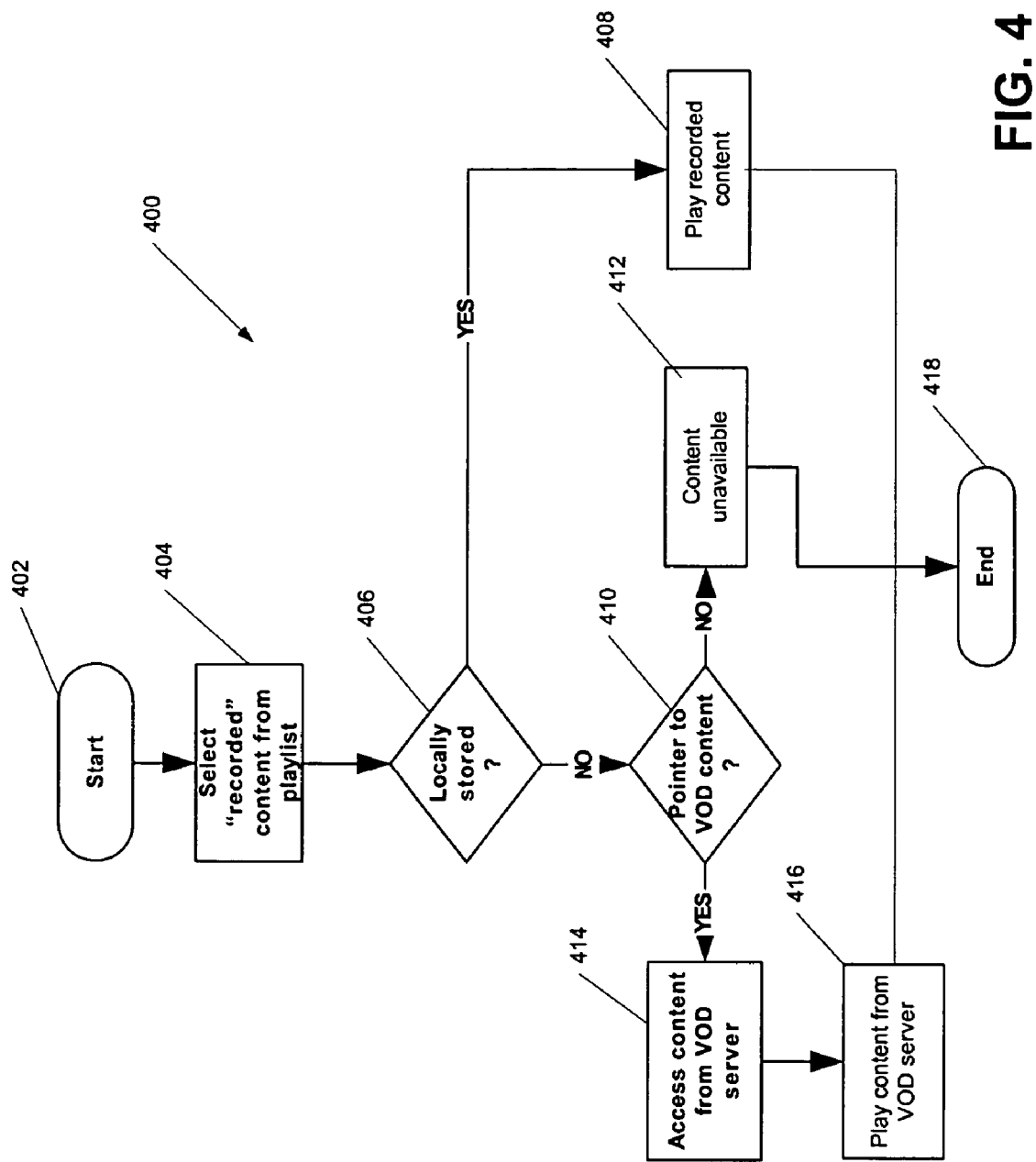
FIG. 4 shows a flow chart of an illustrative process for playback of recorded content in accordance with one embodiment of the present invention.

FIG. 4 is a flow chart of an illustrative process for play-back of a recorded program listed on a play list. Here the playlist can be considered the list of available "recorded" programs. As mentioned above, a program selected by a user for local recording may prompt an interactive television application to record on recording device 114 equivalent actual VOD content or a pointer to the VOD content on the VOD server.

Process 400 starts at step 402. When a request for playback of a recorded program listed on the play list is received at step 404, it is determined at step 406, if the program has been locally recorded on recording device 114. If the program has been locally recorded, at step 408 the recorded program is played back on the user equipment 110. If at step 406 no recording of the program on the play list is found on recording device 114, at step 410 the process 400 attempts to identify a pointer to the equivalent VOD content on the VOD server. If no pointer is detected, the process 400 moves to step 412 and may notify the user that the program cannot be located, for example, because it is corrupted or may have expired.

Conversely, if a pointer is located at step 410, the process 400 moves to step 414 to access the equivalent VOD content from the VOD server and at step 416, it plays the selected program. The process 400 ends at step 418.

Note that it may not be apparent to the user from looking at the play list if the program or just a reference to the program is stored.

Figure 5:
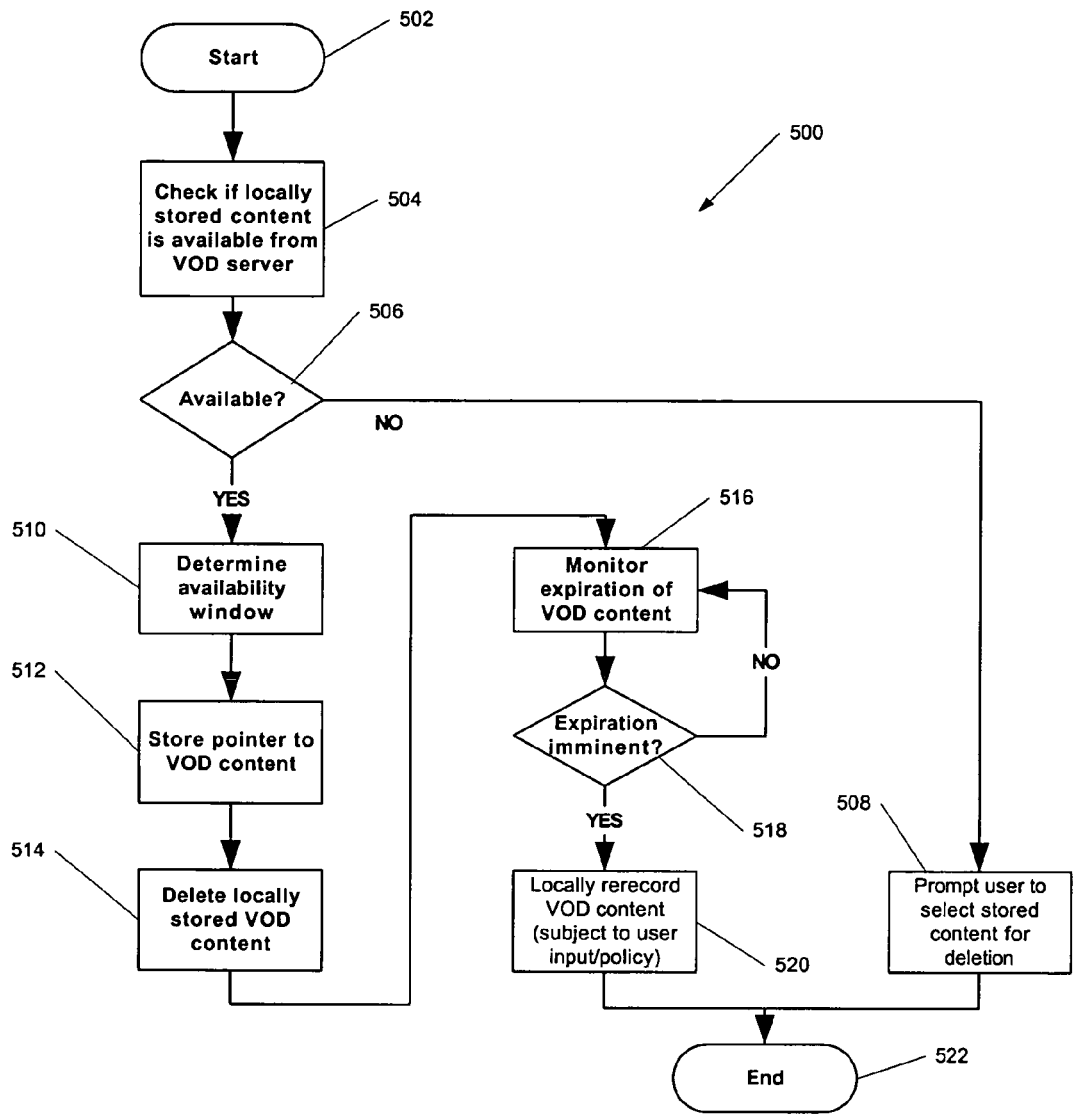
FIG. 5 shows a flow chart of an illustrative process for managing deletion and rerecording of locally recorded VOD content in accordance with one embodiment of the present invention.

FIG. 5 is a flow chart of an illustrative process 500 for managing local storage space on recording device 114, for example, when additional storage capacity is needed on the local recording device 114 and previously recorded programs are concurrently available from a VOD server. Although the described process 500 can be useful for "trading off" between VOD content that is stored on local recording device 114 versus on a VOD server, other uses for managing VOD content can be contemplated.

Process 500 starts at step 502. At step 506 a test is performed to see if locally stored programs are available from a VOD server. If they are not, and space is required for a new recording, at step 508 the user will be prompted to designate a previously recorded program for deletion to free up space. Conversely, if a previously recorded program is available from a VOD server, the interactive multimedia guidance application will determine at step 510 the availability window, in particular the expiration date of the VOD content on the VOD server. The process 500 will then store a pointer to the VOD content on the user equipment, step 512, and delete the actual recorded program from recording device 114 at step 514. This approach can free up storage space in recording device 114 for recording another program in a manner described above.

The process 500 continues to monitor the expiration date/time of the VOD content on the VOD server in the loop of step 516 and test 518, and may, if the VOD content is soon to expire, as determined at step 518, rerecord at step 520 the VOD content on the local recording device 14, subject to user input, dynamic factors, rental conditions, etc and then terminate at step 522.

Note that the VOD content may be distribution controlled, in which case the VOD server may restrict recording and copying of the VOD content. For example, a "broadcast" flag may be set in the VOD content to indicate that the content can not be copied. Alternatively, a "never copy" flag may be set, or a "play once" flag may be reset, in digital rights management protocols such as IEEE 1394 5C. More information on IEEE 1394 5C can be found in "Digital Transmission Content Protection Specification Revision 1.4 (Informational Version)," Feb. 28, 2005, available from Digital Transmission Licensing Administrator (DTLA), 225 B Cochrane Circle, Morgan Hill, Calif. 95037 (USA), which is incorporated herein by reference in its entirety. It should be understood that certain embodiments of the present invention will include steps of checking and considering in various implementation algorithms, the implications of such distribution and copy protections as well as security, encryption, and access control considerations.

Although hard drives with a storage capacity of hundreds of gigabytes have recently become cost-effective for incorporation in user equipment, such as set top boxes (STB), the available storage space on recording device 114 may still limit local recording of programs. However, situations may arise where VOD assets may not be always available, for example, because a connection between the VOD client and the VOD server has insufficient bandwidth, for example, at certain peak traffic times, or tends to be otherwise unreliable. It may then be advantageous to give priority to recording the scheduled broadcast instead of the equivalent VOD content. Since the available transmission bandwidth and access times to the VOD server can be determined by both the headend and the user equipment, the system may decide dynamically to either locally record the broadcast or a pointer to the equivalent VOD asset.

Figure 6:
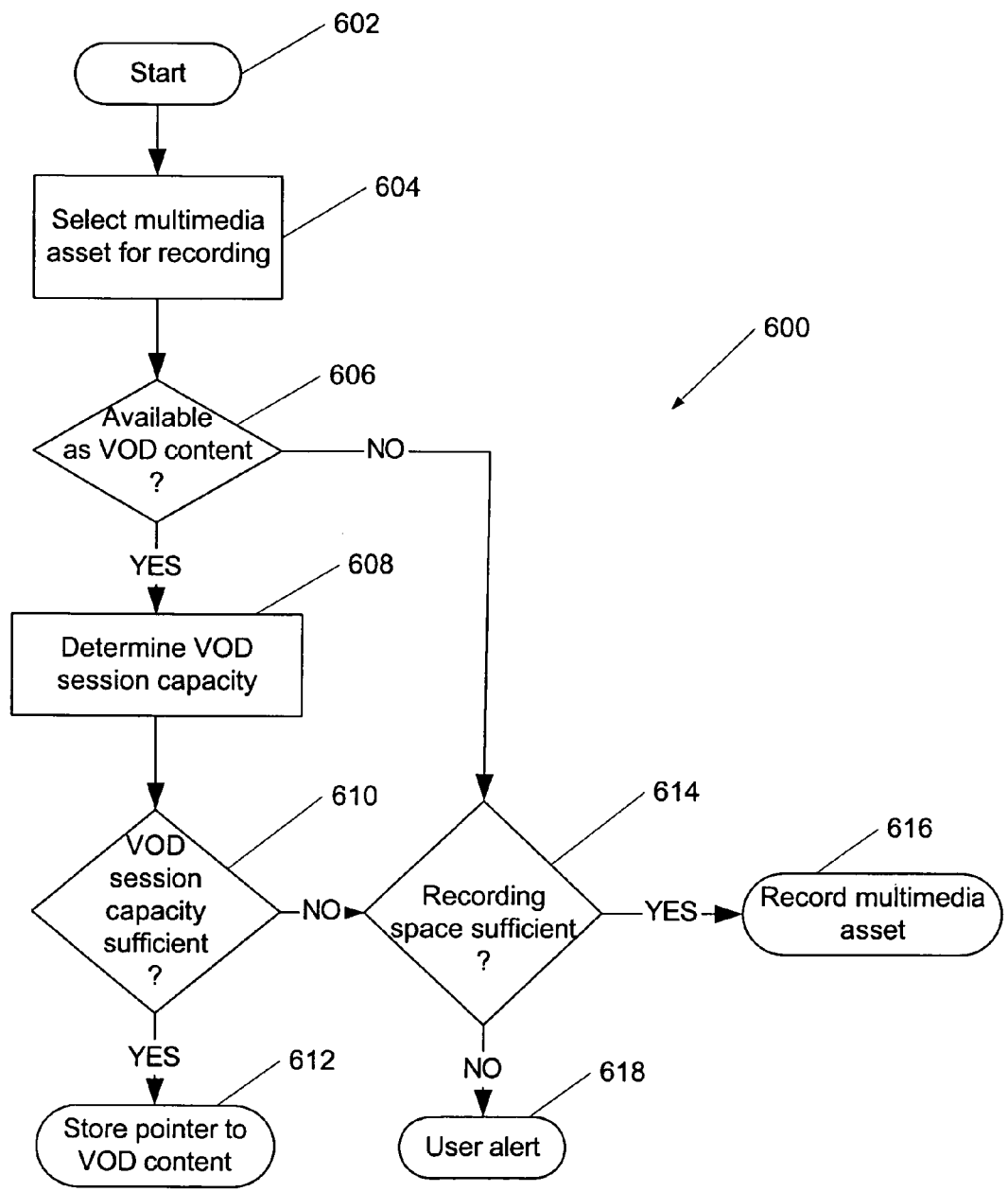
FIG. 6 is a flow chart of an illustrative process for dynamically managing system resources.

FIG. 6 is a flow chart of an illustrative process 600 for dynamically managing system resources when locally recording multimedia assets. The process 600 begins at step 602. At step 604, a user and/or an interactive multimedia guidance application selects multimedia assets, such as a television broadcast programs or a web cast, to be recorded locally. At step 606 the interactive multimedia guidance application then checks if one or more of the multimedia assets is available from a VOD server. If this is not the case, the process 600 moves to step 614 to check if the local recording device has sufficient recording capacity. If the recording capacity is sufficient, at step 616 the multimedia asset is recorded; otherwise, at step 618 the user may be alerted of a conflict, e.g., by a displayed message.

Conversely, if step 606 it is determined that the multimedia content is available from the VOD server, the process 600 moves to steps 608 to determine available VOD session capacity, such as transmission bandwidth and latency. If at step 610 it is determined that the VOD session capacity is sufficient, process 600 ends by storing locally a pointer to the equivalent VOD content rather than actually recording the asset or the corresponding equivalent VOD content. On the other hand, if the VOD session capacity is insufficient for reliably transmitting real-time VOD content, the process 600 moves to steps 614 and 616 to locally record the program or VOD content, subject to available storage space on the local recording device. If the recording capacity is insufficient, as determined at step 614, the user may be alerted as above by a displayed message in step 618.

Note that third party applications may be able to use the disclosed invention to play back assets that are stored both locally and in the headend to minimize network traffic. The third party could query the assets stored locally to see if the requested VOD asset is available on the local recording device 114 and play it back from the local recording device 114 to reduce network traffic.

Figure 7:
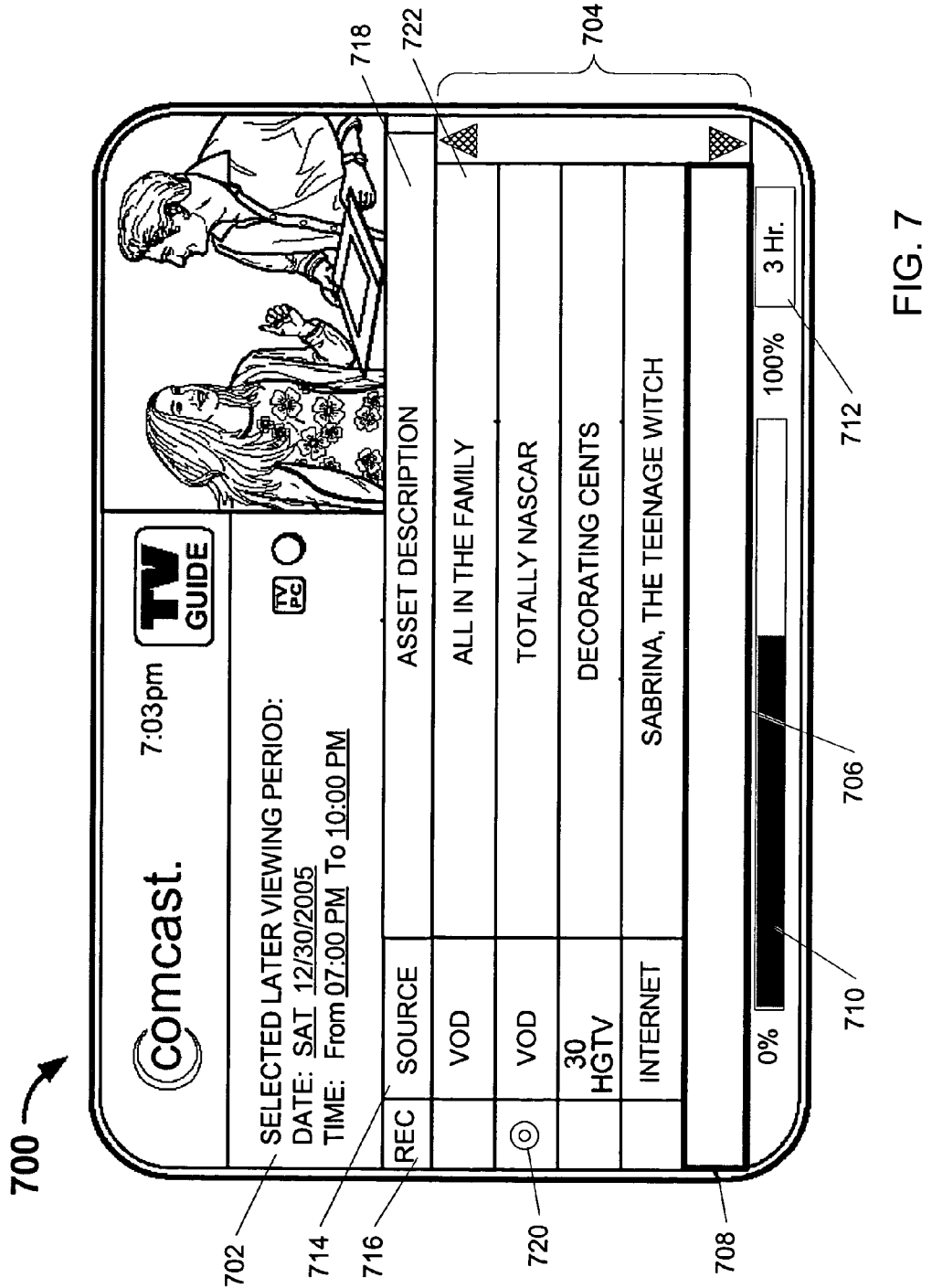
FIG. 7 depicts an exemplary "watch-later" user interface associated with an embodiment of the invention that includes a user feature for finding multimedia assets available during a future viewing period of interest.

FIG. 7 depicts a "watch-later" user interface 700 associated with an embodiment of the invention that includes a user feature for finding multimedia assets available during a future viewing period of interest. The user interface includes a list of assets 704 that could be available for future viewing based on a specified future viewing period displayed in a watch-later period selector 702. The watch-later period selector 702 may be a drop-down menu accessible from a remote control device. Each asset is characterized by a record status 716, a source 714, and an asset description 718. The future viewing period illustrated in FIG. 7 is Saturday Dec. 30, 2005 from 7 PM to 10 PM. Upon selection of a future viewing time for assets, the system searches for a plethora of multimedia assets that are available up to the beginning of the watch-later period, from whatever source (e.g., PPV, VOD, Internet, and broadcast) and presents a list of these multimedia assets in asset list 704. In generating this list, the system recognizes that if one or more of those assets expires before the beginning of the watch-later period, it could be recorded, and considers factors (e.g., tuner availability, VOD bandwidth, storage capacity, and digital rights management issues) as described in other embodiments, which issues might or might not allow those assets to be stored or viewable during the watch-later period. The watch-later feature presents these assets and makes one or more of them available for selection (e.g., via highlight and selection via remote control). When a highlighted asset (e.g., highlighted asset 706) is selected, an indicator may be displayed associated with the asset (e.g., a highlighted eyeball indicator 708 on selected asset 706) to indicate to the user that the selected asset is now set for future viewing. The selected asset may also be added to a playlist of selected viewable assets that is organized, for example, by watch-later periods that the user has added viewable assets to.

FIG. 7 depicts the result of a user first highlighting and then selecting the "Men In Black" PPV asset 706 for future viewing. As illustrated, a highlighted eyeball 708 appears in the REC field of "Men In Black" to indicate that this asset is now set for viewability in the future viewing period. Prior to selecting "Men In Black" for future viewing, a grayed-out eyeball appeared in the position of the presently highlighted eyeball 708. A grayed-out eyeball, such as grayed-out eyeball 720 in the REC field of the VOD asset "TOTALLY NASCAR," indicates an asset that could be made available for future viewing during the future period but which has not been selected. Assets with a grayed-out eyeball will expire before the beginning of the future viewing period and thus must be selected for recording and be recorded prior to expiring if it is desired to make them available during the future viewing period. Note that other PPV or VOD assets that are available during the viewing period would not have a grayed-out eyeball and would not need to be recorded in advance of the future viewing period so as to be available in the future viewing period. This is the case, for example, with the "ALL IN THE FAMILY" list element 722.

FIG. 7 may also include a disk-usage indicator 710 for dynamically indicating, as assets are selected, how much space is left on the users local harddrive, and a recording time remaining indicator 712 to In one or more implementations, some additional indicators, such as remaining storage space indicator 710 are provided to and roughly indicate how many additional hours of assets may be stored on the hard drive.

In some embodiments, the source 714 of the assets may be indicated. Additionally, in one or more embodiments, the "available" assets list may be dynamically modified as a function of those assets that get selected, in consideration of, for example local storage, and expiration times of some VOD assets. Note that selection of additional assets for viewing, as long as the additional assets are available through the viewing period on VOD, should not affect the hard disk remaining capacity indicators. However, once enough assets have been selected that there is no remaining additional space on the hard drive, all VOD, PPV, Internet-based, or broadcast programs that expire before the watch-later viewing period will be removed from the list of available assets that is presented to the user.

The above described embodiments of the present invention are presented for purposes of illustration and not of limitation, and the present invention is limited only by the claims which follow.

What is claimed is:

1. A method for managing resources in a multimedia delivery network, the method comprising:
scheduling on a personal video recorder (PVR) a local recording of a multimedia asset that is available during a first window of time from a first source;
gathering information related to resources of the PVR and the multimedia delivery network;
determining whether an equivalent multimedia asset with a same title and the same program content as the multimedia asset is available outside the first window of time from at least one alternative source, wherein the equivalent multimedia asset is stored remotely and the at least one alternative source is other than a broadcast source; and
deciding, based upon the determining and applying other system and/or user-specified criteria, whether or not to record the multimedia asset locally, wherein when it is decided not to record the multimedia asset locally, the method further comprises:
deferring the local recording of the multimedia asset beyond the first window of time; and
storing a first multimedia asset pointer that allows access to the equivalent multimedia asset locally.

2. The method of claim 1, wherein gathering information comprises checking an amount of local storage space that is available on the PVR, and wherein applying the other criteria includes determining whether the local storage space is sufficient to record the multimedia asset.

3. The method of claim 1, wherein gathering information comprises determining a number of tuners that are available during the first window of time and applying the other criteria includes determining that tuners are available when recording will be performed.

4. The method of claim 1, wherein the at least one alternative source comprises a video-on-demand (VOD) server.

5. The method of claim 1, wherein the at least one alternative source comprises a pay-per-view (PPV) channel.

6. The method of claim 1, wherein the at least one alternative source comprises an Internet server.

7. The method of claim 1, wherein gathering information includes determining an expiration time of the equivalent multimedia asset from the at least one alternative source.

8. The method of claim 7, wherein, when the expiration time of the equivalent multimedia asset from the at least one alternative source is imminent, the method further comprises recording on the PVR the equivalent multimedia asset from the at least one alternative source.

9. The method of claim 1, further comprising presenting a user interface to a user of the PVR wherein a multimedia asset that is stored locally is represented to the user in the same way as the equivalent multimedia asset for which only a pointer is stored.

10. The method of claim 1, wherein gathering information includes determining a digital rights restriction associated with the equivalent multimedia asset from the at least one alternative source and applying the other criteria includes determining whether accessing or recording the equivalent multimedia asset violates at least one digital right.

11. The method of claim 1, further comprising:
comparing locally stored multimedia assets with equivalent assets available from the at least one alternative source;
deleting at least one of the locally stored multimedia assets; and
storing a second multimedia asset pointer to a multimedia asset that is equivalent to and has the same program content as the at least one deleted multimedia asset.

12. The method of claim 1, further comprising:
scheduling on the PVR a local recording of a second multimedia asset during a second window of time, the second multimedia asset different from the multimedia asset; and
determining that a tuner resource conflict exists due to an overlap between the first and the second windows of time, wherein the deciding is a function of the determining that the tuner resource conflict exists.

13. The method of claim 1, further comprising:
capturing a desired future viewing time from the PVR user, the viewing time being later than the first window of time; and
presenting to the user a list of multimedia assets that are viewable during that future viewing time wherein the list includes the equivalent multimedia asset.

14. The method of claim 13, further comprising:
allowing the user to select the equivalent multimedia asset from the list for future viewing, wherein the gathering information includes determining whether the user selected the equivalent multimedia asset from the list and the applying the criteria is a function of whether or not the user selected the equivalent multimedia asset from the list.

15. The method of claim 13, wherein the gathering information includes determining an expiration time for the equivalent multimedia asset and the method further comprises updating the list to remove the listing of the equivalent multimedia asset if the expiration time is earlier than the viewing time.

16. The method of claim 1, wherein when it is decided not to record the multimedia asset locally, the method further comprising storing a beginning portion of the equivalent multimedia asset locally as part of a quick-start feature for the multimedia asset.

17. The method of claim 1, wherein gathering information comprises checking a remaining storage capacity of the PVR, wherein, if the remaining storage capacity is insufficient for recording the multimedia asset, applying a deletion criterion to identify a stored multimedia asset to be deleted from the PVR.

18. The method of claim 17, wherein the deletion criterion comprises a date/time when a stored multimedia asset was last watched, a frequency with which a stored multimedia asset was accessed, a designation as "archived program," a rental conditions for the stored multimedia asset, a current availability of a stored multimedia asset from a server, a user's permission for deletion, or a combination thereof.

19. The method of claim 18, further comprising notifying a user if the remaining storage capacity remains insufficient after applying the deletion criterion.

20. The method of claim 1, further comprising locally recording the multimedia asset, if on-demand session capacity is insufficient for real-time transmission of the equivalent multimedia asset from the at least one alternative source.

21. The method of claim 20, wherein the on-demand session capacity includes at least one of a transmission bandwidth from the at least one alternative source and a latency from the at least one alternative source.

22. A system to manage resources in a multimedia delivery network, the system comprising a personal video recorder (PVR) with control circuitry configured to:
schedule on the PVR a local recording of a multimedia asset that is available during a first window of time from a first source;
gather information related to resources of the PVR and the multimedia delivery network;
determine whether an equivalent multimedia asset with a same title and the same program content as the multimedia asset is available from at least one alternative source outside the first window of time, wherein the equivalent multimedia asset is stored remotely and the at least one alternative source is other than a broadcast source; and
decide, based upon the determining and applying other system and/or user-specified criteria, whether or not to record the multimedia asset locally, wherein when it is decided not to record the multimedia asset locally, the control circuitry is further configured to:
defer the local recording of the multimedia asset beyond the first window of time; and
store a first multimedia asset pointer h that allows access to the equivalent multimedia asset locally.

23. The system of claim 22, the control circuitry further configured to check an amount of local storage space that is available on the PVR, and to determine whether the local storage space is sufficient to record the multimedia asset.

24. The system of claim 22, wherein the at least one alternative source comprises a video-on-demand (VOD) server.

25. The system of claim 22, wherein the at least one alternative source additionally comprises a pay-per-view (PPV) channel.

26. The system of claim 22, wherein the at least one alternative source additionally comprises an Internet server.

27. The system of claim 22, the control circuitry further configured to determine if an expiration time of the equivalent multimedia asset from the at least one alternative source is imminent, and if the expiration time is imminent, to cause the PVR to record the equivalent multimedia asset from the at least one alternative source.

28. The system of claim 22, the control circuitry further configured to:
compare multimedia assets stored on the PVR with equivalent assets available from the at least one alternative source;
delete at least one of the multimedia assets stored on the PVR; and
store a second multimedia asset pointer to a multimedia asset that is equivalent to and has the same program content as the at least one deleted multimedia asset.

29. The system of claim 22, the control circuitry further configured to:
  schedule on the PVR a local recording of a second multimedia asset during a second window of time, the second multimedia asset different from the multimedia asset;
  determine that a tuner resource conflict exists due to an overlap between the first and the second window of time; and
  decide, based upon the determination of a conflict and by applying other system and/or user-specified criteria, whether or not to record the multimedia asset locally.

30. The system of claim 22, the control circuitry further configured to:
  check a remaining storage capacity of the PVR; and
  if the remaining storage capacity is insufficient to record the multimedia asset, apply a deletion criterion to identify a stored multimedia asset to be deleted from the PVR.

31. The system of claim 30, wherein the deletion criterion comprises a date/time when a stored multimedia asset was last watched, a frequency with which a stored multimedia asset was accessed, a designation as "archived program," a rental conditions for the stored multimedia asset, a current availability of a stored multimedia asset from a server, a user's permission for deletion, or a combination thereof.

32. The system of claim 30, the control circuitry further configured to notify a user if the remaining storage capacity remains insufficient after applying the deletion criterion.

33. The system of claim 22, the control circuitry further configured to cause the PVR to record the multimedia asset, if VOD session capacity is insufficient for real-time transmission of the equivalent multimedia asset from the at least one alternative source.

34. The system of claim 33, wherein the VOD session capacity includes at least one of a transmission bandwidth from the at least one alternative source and a latency from the at least one alternative source.

35. The method of claim 1 wherein determining whether an equivalent multimedia asset is available from the at least one alternative source comprises:
  searching assets available from a VOD server or VOD service; and
  searching assets available from at least one other source selected from the group consisting of a pay-per-view (PPV) channel and an Internet server.

36. The method of claim 1 wherein the first source is different than the at least one alternative source.

37. The system of claim 22 wherein the control circuitry is configured to determine whether an equivalent multimedia asset is available from the at least one alternative source by:
  searching assets available from a VOD server or VOD service; and
  searching assets available from at least one other source selected from the group consisting of a pay-per-view (PPV) channel and an Internet server.

38. The system of claim 22 wherein the first source is different than the at least one alternative source.

* * * * *